(No Model.)
C. G. ZIPF.
DAMPER.
No. 330,955.
2 Sheets—Sheet 1.
Patented Nov. 24, 1885.
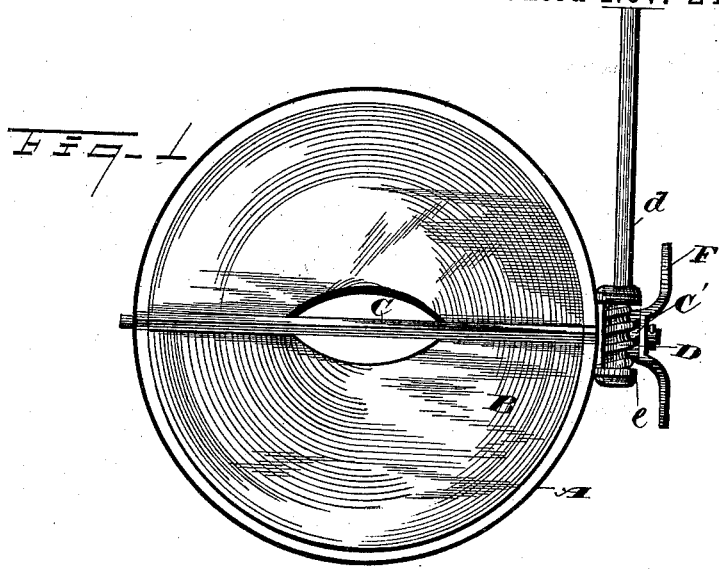
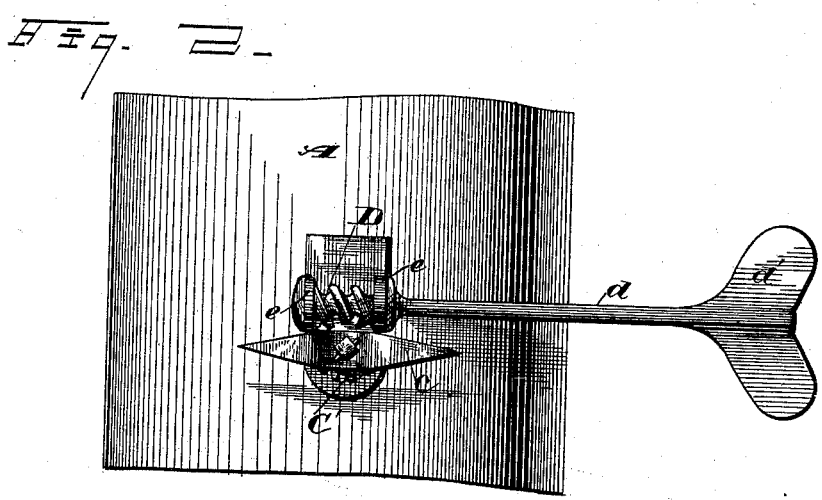
WITNESSES
INVENTOR (No Model.) C. G. ZIPF. 2 Sheets—Sheet 2.
DAMPER.
No. 330,955. Patented Nov. 24, 1885.
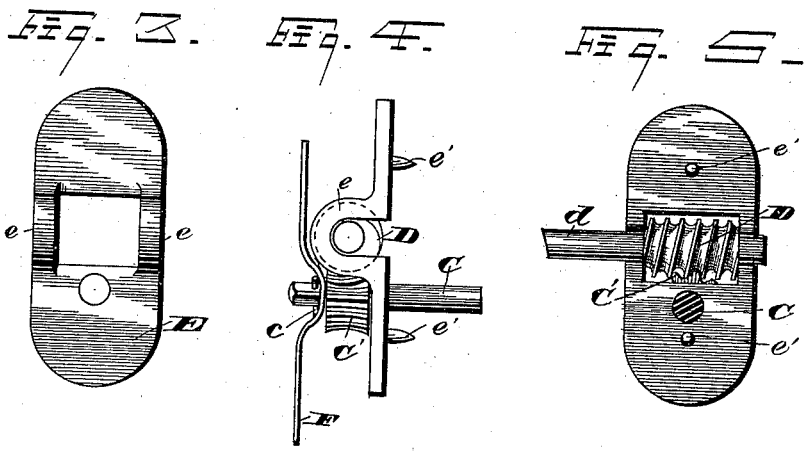

UNITED STATES PATENT OFFICE.

CARL G. ZIPF, OF CLEVELAND, OHIO.

DAMPER.

SPECIFICATION forming part of Letters Patent No. 330,955, dated November 24, 1885.

Application filed February 24, 1885. Serial No. 156,919. (No model.)

*To all whom it may concern:*

Be it known that I, CARL G. ZIPF, of Cleveland, in the county of Cuyahoga and State of Ohio, have invented certain new and useful Improvements in Dampers; and I do hereby declare the following to be a full, clear, and exact description of the invention, such as will enable others skilled in the art to which it pertains to make and use the same.

My invention relates to improvements in dampers, the object being to provide a worm-gear mounted on the spindle of the damper, and a worm engaging such gear with the spindle thereof, provided with a thumb-piece for revolving the worm and actuating the damper, and an index attached to the spindle to indicate the position of the damper.

With this object in view my invention consists in certain features of construction and in combination of parts, hereinafter described, and pointed out in the claim.

In the accompanying drawings, Figure 1 is a plan view of a damper and my improvements attached. Fig. 2 is a side elevation of the same. Fig. 3 is a front elevation of the plate E. Fig. 4 is a side elevation of the plate E, with the damper-spindle, worm-gear, and pointer in position, showing also in dotted lines the position of the worm. Fig. 5 is a rear elevation of the plate E detached, showing the worm in position.

A represents the pipe; B, the damper, mounted on the spindle C, to which is attached the worm-gear C' and the index or pointer F. D is a worm that engages the said gear, and is mounted on the spindle $d$, that is provided with a thumb-piece, $d'$, for revolving the same. E is a plate with outwardly-projecting lugs $e$, in which is journaled the spindle $d$, and has a lateral bore, in which is journaled one end of the spindle of the damper. This plate, at the rear, is provided with teats $e'$, that extend through corresponding holes in the pipe, and are riveted on the inside, securing the plate to the pipe. A pointer, F, is mounted on the outer end of the damper-spindle, to indicate the position of the damper.

By turning the worm the damper is actuated, and may be set in any position to regulate the draft as required, and when set will be retained in such position until further movement of the damper is necessary.

The plate E, the worm and spindle, and worm-gear are all of cast metal, and require no fitting. The device is therefore cheap. The plate E, with the worm in position, is riveted to the pipe. The damper and spindle are next placed in position. The worm-gear is then slipped on the square end of the spindle, together with the pointer, and the parts held in position by the pin $c$.

I am aware that it is not new to operate a damper by means of worm-gearing, and also that it is old to connect a pointer to a damper-spindle; hence I make no broad claim to these parts separately considered; but

What I claim is—

The combination, with a damper-spindle having a damper, a worm-gear, and a pointer thereon, of the plate E, having outwardly-projecting bearings, a spindle journaled in said bearings, a worm secured on said spindle and engaging the worm gear, and a thumb-piece secured to or formed integral with the spindle.

In testimony whereof I sign this specification, in the presence of two witnesses, this 14th day of February, 1885.

CARL G. ZIPF.

Witnesses:
CHAS. H. DORER,
ALBERT E. LYNCH.